United States Patent
Luneau

(10) Patent No.: US 7,099,439 B2
(45) Date of Patent: Aug. 29, 2006

(54) LOOP TEST APPARATUS AND METHOD

(75) Inventor: David J. Luneau, Concord, NH (US)

(73) Assignee: ClassCo Inc., Concord, NH (US)

( * ) Notice: Subject to any disclaimer, the term of this patent is extended or adjusted under 35 U.S.C. 154(b) by 322 days.

(21) Appl. No.: 10/082,403

(22) Filed: Feb. 25, 2002

(65) Prior Publication Data

US 2002/0118795 A1 Aug. 29, 2002

Related U.S. Application Data

(60) Provisional application No. 60/271,556, filed on Feb. 26, 2001.

(51) Int. Cl.
*H04M 1/24* (2006.01)
*H04M 1/56* (2006.01)

(52) U.S. Cl. ............... 379/27.01; 379/22.01; 379/29.01; 379/1.04; 379/142.01

(58) Field of Classification Search ............ 379/27.01, 379/27.06, 28, 29.01, 29.11, 22.01, 22.02, 379/27.03, 1.04, 102.01, 32.04, 29.03, 142.01; 370/249, 903
See application file for complete search history.

(56) References Cited

U.S. PATENT DOCUMENTS

| | | | |
|---|---|---|---|
| 4,656,652 A | 4/1987 | Nagai | 379/41 |
| 5,029,290 A | 7/1991 | Parsons et al. | 340/533 |
| 5,121,430 A | 6/1992 | Ganzer et al. | 380/48 |
| 5,265,145 A | 11/1993 | Lim | 379/88 |
| 5,394,461 A | 2/1995 | Garland | 379/106 |
| 5,434,906 A | 7/1995 | Robinson et al. | 379/67 |
| 5,509,054 A | 4/1996 | Garland | 379/106 |
| 5,541,980 A | 7/1996 | Urewicz | 379/61 |
| 5,761,312 A | 6/1998 | Zelikovitz et al. | 380/49 |
| 5,875,232 A | 2/1999 | Wolf | |
| 5,905,774 A | 5/1999 | Tatchell et al. | |
| 5,949,851 A | 9/1999 | Mahaffey | 379/48 |
| 5,966,651 A | 10/1999 | Sibecas | |
| 6,002,748 A | 12/1999 | Leichner | 379/48 |
| 6,021,177 A | 2/2000 | Allport | 379/48 |
| 6,067,349 A | 5/2000 | Suder et al. | |
| 6,072,859 A | 6/2000 | Kong et al. | |

(Continued)

OTHER PUBLICATIONS

Garland et al., "Application Notes, Proactive Loop Maintenance via Intelligent Pathway Application Example: Customer Premise Loop Test Interface Capability", Lucent Technologies, Inc., Issue 0.3, Nov. 24, 1998.

(Continued)

*Primary Examiner*—Barry Taylor
(74) *Attorney, Agent, or Firm*—Fish & Richardson P.C.

(57) ABSTRACT

Systems and methods are described for measuring the quality of telephone transmission lines. A device, such as a loop test apparatus, can be located at a customer's premises and used for remotely diagnosing telephone line impairments, especially concerning the local loop and customer premises wiring. Such a device is valuable for determining if a telephone line is suitable for new services, such as DSL. The loop test apparatus can incorporate an integrated local loopback feature that can be controlled from a loop testing server (LTS) at, e.g., a telephone Central Office. The loop test apparatus can terminate a telephone line at the customer premises based on a message sent by the LTS. The local loopback will then reflect signals transmitted by the LTS back to the LTS so that line characteristics of the local loop and customer premises wiring can be analyzed, without the need to dispatch telephone company service equipment and/or personnel to a customer premises.

28 Claims, 3 Drawing Sheets

U.S. PATENT DOCUMENTS

| | | | |
|---|---|---|---|
| 6,078,646 A * | 6/2000 | McLaughlin et al. | 379/27.01 |
| 6,160,876 A | 12/2000 | Moss et al. | |
| 6,201,856 B1 | 3/2001 | Orwick et al. | 379/40 |
| 6,233,325 B1 | 5/2001 | Frech et al. | |
| 6,233,430 B1 | 5/2001 | Helferich | 455/31.1 |
| 6,243,442 B1 | 6/2001 | Tanaka et al. | 379/45 |
| 6,246,752 B1 | 6/2001 | Bscheider et al. | 379/88.22 |
| 6,249,570 B1 | 6/2001 | Glowny et al. | 379/88.22 |
| 6,249,579 B1 | 6/2001 | Bushnell | 379/356 |
| 6,252,946 B1 | 6/2001 | Glowny et al. | 379/88.22 |
| 6,252,947 B1 | 6/2001 | Diamond et al. | 379/88.22 |
| 6,252,952 B1 | 6/2001 | Kung et al. | 379/114 |
| 6,253,061 B1 | 6/2001 | Helferich | 455/31.2 |
| 6,259,692 B1 | 7/2001 | Shtivelman et al. | 370/352 |
| 6,259,892 B1 | 7/2001 | Helferich | 455/31.3 |
| 6,266,340 B1 | 7/2001 | Pickett et al. | 370/442 |
| 6,266,341 B1 | 7/2001 | Surprenant et al. | 370/458 |
| 6,272,212 B1 | 8/2001 | Wulforst et al. | 379/199 |
| 6,285,364 B1 | 9/2001 | Giordano, III et al. | 345/347 |
| 6,289,025 B1 | 9/2001 | Pang et al. | 370/261 |
| 6,289,084 B1 | 9/2001 | Bushnell | 379/67.1 |
| 6,289,094 B1 | 9/2001 | Miloslavsky | 379/220 |
| 6,292,482 B1 | 9/2001 | Pickett | 370/352 |
| 6,292,901 B1 | 9/2001 | Lys et al. | 713/300 |
| 6,295,348 B1 * | 9/2001 | Bleile et al. | 379/199 |
| 6,295,455 B1 | 9/2001 | Fischer et al. | 455/456 |
| 6,298,045 B1 | 10/2001 | Pang et al. | 370/261 |
| 6,301,480 B1 | 10/2001 | Kennedy, III et al. | 455/445 |
| 6,304,580 B1 | 10/2001 | Christie et al. | 370/467 |
| 6,310,944 B1 | 10/2001 | Brisebois et al. | 379/142.01 |
| 6,320,947 B1 | 11/2001 | Joyce et al. | 379/144 |
| 6,324,279 B1 | 11/2001 | Kalmanek, Jr. et al. | 379/229 |
| 6,327,342 B1 | 12/2001 | Mobley et al. | 379/45 |
| 6,327,343 B1 | 12/2001 | Epstein et al. | 379/88.01 |
| 6,327,359 B1 | 12/2001 | Kang et al. | 379/221.08 |
| 6,327,570 B1 | 12/2001 | Stevens | 705/7 |
| 6,330,010 B1 | 12/2001 | Nason et al. | 345/802 |
| 6,332,021 B1 | 12/2001 | Latter et al. | 379/142.01 |
| 6,332,085 B1 | 12/2001 | Hanson et al. | 455/557 |
| 6,337,717 B1 | 1/2002 | Nason et al. | 348/567 |
| 6,340,868 B1 | 1/2002 | Lys et al. | 315/185 S |
| 6,343,074 B1 | 1/2002 | Pickett | 370/353 |
| 6,343,120 B1 | 1/2002 | Rhodes | 379/142 |
| 6,345,260 B1 | 2/2002 | Cummings, Jr. et al. | 705/8 |
| 6,356,554 B1 | 3/2002 | Pickett et al. | 370/402 |
| 6,359,970 B1 | 3/2002 | Burgess | 379/67.1 |
| 6,363,346 B1 | 3/2002 | Walters | 704/231 |
| 6,363,411 B1 | 3/2002 | Dugan et al. | 709/202 |
| 6,366,578 B1 | 4/2002 | Johnson | 370/353 |
| 6,370,235 B1 | 4/2002 | Heiner | 379/67.1 |
| 6,370,523 B1 | 4/2002 | Anderson | 707/3 |
| 6,373,817 B1 | 4/2002 | Kung et al. | 370/217 |
| 6,374,078 B1 | 4/2002 | Williams et al. | 455/7 |
| 6,374,102 B1 | 4/2002 | Brachman et al. | 455/422 |
| 6,381,316 B1 | 4/2002 | Joyce et al. | 379/114.2 |
| 6,381,324 B1 | 4/2002 | Shaffer et al. | 379/211.02 |
| 6,456,694 B1 * | 9/2002 | Posthuma | 379/1.04 |
| 6,509,833 B1 | 1/2003 | Tate | |
| 6,584,148 B1 * | 6/2003 | Zitting et al. | 375/222 |
| 6,643,266 B1 * | 11/2003 | Pugaczewski | 370/249 |
| 6,744,867 B1 * | 6/2004 | Chin et al. | 379/142.01 |
| 2003/0147518 A1 | 8/2003 | Albal et al. | |
| 2004/0100648 A1 | 5/2004 | Kulakowski | |

OTHER PUBLICATIONS

Press Release, "Turnstone's New T100 TDR Card Enables Remote, Long-Reach TDR Testing Without Truck Rolls", Source: Turnstone Systems, Inc., Jun. 5, 2001.

Dunford et al., Consultronics, "xDSL Service Testing A White Paper for Telecommunication and Internet Service Providers".

Turnstone, "Accelerate Residential DSL Deployment: Loop Management throughout the DSL Lifecycle, White Paper".

Page Update, "Weather Alert 2000, The Next Generation of Severe Weather Notification", undated.

Bell Phones by Northwestern Bell Phones, "The Weatherphone", undated.

Consumer Electronics Daily News, "Northwestern Bell, Roosternet to Deliver E-mail Notification Via Caller ID", Jan. 9, 2002, p. 6.

RoosterNet, Inc., "Bridging the gap between the off-line and on-line".

Dialogic Communications Corp., "Kentucky Adds Speed, Accuracy to Emergency Communications with Ten-County Implementation of The Communicator!", Mar. 9, 2001.

Monitor wire reports News in Brief, "Pages to alert hearing impaired to storms", Jul. 3, 2001.

Cringely, "Wakeup Call In This Wired World, We Can Tell People Pretty Much Anything Except That There is a Cloud of Poison Gas Blowing Their Way", May 3, 2001, http://www.pbs.org/cringely/pulpit/pulpit200110503.html.

Aubry, "Storm alerts coming soon by E-mail, cell", Montrealgazette.com, Aug. 21, 2001.

Community Alert Network, Inc., "The Toolbox", undated.

Police News, "Reverse 911 and Guardian Calling", http://www.roselle.il.us/Police_News.htm, undated.

Lynch, "Officials, public alerted to value of Reverse 911", Chicago Tribune, Oct. 31, 2001, http://pqasb.pqarchiver.com/chicagotribune/main/abstract.html (Abstract).

Sigma Micro Corporation, "Reverse911.net Mutual Aid Notification Network Now Available to R911 Users", May 7, 2001, http://www.sigma-micro.com/Sigma_PR2.htm.

Sigma Micro Corporation, "Visionary Applications. Superior Service", http://www.sigma-micro.com/Company.htm (2001).

Sigma Micro Corporation, "Size Doesn't Matter", http://www.sigma-micro.com/ClientList.htm (2001).

Direct Alert America, "A National Emergency Warning Service for the 21st Century", www.directalertamerica.com, undated.

Allport Group, "Community Notification using patented Allport Methodology", www.AllportGroup.com (2001).

Popular Science, "What's New", May 2001, p. 17.

BellSouth, "BellSouth Government Emergency Telecommunications Service (GETS)", http://interconnection.bellsouth.com/products/vertical/gets.html, undated.

Link, "A Proposed Signal and Data Protocol and CPE Compatibility Considerations for Transmission and Reception of Public Safety-Related Alerting and Information Messages Using GR-30-CORE Voice Band Data Transmission", Telcordia Technolgies, TM-26023 Apr. 2001.

iBlast, "iBlast to Begin Pilot Test of Datacasting Industry's First-Ever Emergency Alert Service", Mar. 12, 2001, http://www.iblast.com/press.php3?aid=31.

International Search Report, Apr. 4, 2003.

Garland et al., "Application Notes, Proactive Loop Maintenance via Intelligent Pathway Application Example: Customer Premise Loop Test Interface Capability", Lucent Technologies, Inc., Issue 0.3, Nov. 24, 1998.

Press Release, "Turnstone's New T100 TDR Card Enables Remote, Long-Reach TDR Testing Without Truck Rolls", Source: Turnstone Systems, Inc., Jun. 5, 2001.

Dunford et al., Consultronics, "xDSL Service Testing A White Paper for Telecommunication and Internet Service Providers".

Turnstone, "Accelerate Residential DSL Deployment: Loop Management throughout the DSL Lifecycle, White Paper".

Bellcore, "LSSGR: Voiceband Data Transmission Interface, Section 6.6" GR-30-CORE, Issue 1, Dec. 1994.

* cited by examiner

LOOP TEST APPARATUS AND METHOD

This application claims priority from U.S. Provisional Patent Application No. 60/271,556, filed Feb. 26, 2001.

TECHNICAL FIELD

The invention relates to systems and methods for measuring the quality of telephone transmission lines. The systems and methods may be used in conjunction with a loop test apparatus that can terminate a telephone line at the customer premises based on a message sent by a centrally located loop testing server (LTS).

BACKGROUND

Changes in the North American telephone network have opened the door to new services available to business and residential customers. In particular, Digital Subscriber Line (DSL) offers customers high-speed data communications and basic telephone service using the existing subscriber line. DSL is compatible with existing analog telephone devices for providing plain old telephone service (POTS). DSL supports a high-speed data channel above the 4 KHz band traditionally used for POTS.

However, characteristics in the local loop can degrade the suitability of the channel for data transmission. Analog telephone lines exhibit a wide range of frequency-response characteristics dependant on a number of factors, including distance from the central office, quality of splices, customer premises wiring, line loading, and customer premises equipment.

There is often no way to determine if a telephone line is suitable to provide DSL service without dispatching a telephone company field technician with a bucket truck to test the line at the customer site. The technician analyzes the customer's local loop, including the premises wiring, using a telephone line test set. The test set gets plugged into a telephone jack at the customer premises, and performs a return loss measurement at various frequencies from 0 to 1.1 MHz, normally spaced apart by 4.3 KHz. The test shows the line's frequency response, and can be used for measuring the quality of the line and identifying problems in the telephone company loop plant or customer premises wiring.

The same technique can also be used to diagnose other problems related to frequency response, including slow modem connections, caller ID failure, and sometimes even poor voice quality.

Other test sets may be operated by telephone company technicians located at the customer premises in order to test the quality of the telephone line back to the central office, It is done this way primarily because a clear analog channel is not set up unless a device at the customer premises is off-hook.

SUMMARY

The present invention concerns telephone line diagnostic equipment and methods. The equipment can include a data detector, a telephone line terminator, and a processor. The data detector and telephone line terminator are both configured to be connected to a telephone line (such as by a standard RJ-11 telephone jack). The data detector detects data provided on the telephone line, provides signals representing the detected data to a processor (such as a computer microprocessor). The telephone line terminator terminates the telephone line in response to a termination signal received from the processor. The processor generates such a termination signal when it detects a Loop Test Message from the data detector.

The apparatus can be installed at the customer premises as a stand-alone unit or integrated into common POTS CPE (e.g., telephone, modem, answering machine, Caller-ID box). The apparatus goes off-hook in response to a Loop Test Message sent by, e.g., a LTS located, e.g., at the Central Office (CO), thereby causing the line to go off-hook at the customer premises to create a complete analog transmission path between the LTS and the customer premises. While the telephone line at the customer premises is off-hook, the LTS can then send test signals (e.g., signals at a range of frequencies) on the telephone line, and receive signals reflected back on the telephone line from the customer premises, e.g. to perform a return loss measurement to determine aspects of the frequency response of the telephone line. The apparatus thus avoids the need to dispatch telephone company service resources to the customer premises.

Embodiments of the invention can include the following features. The data detector is a frequency-shift key (FSK) detector, and the data detected by the data detector on the telephone line is encoded in accordance with the GR-30 standard. The telephone line terminator includes a resistor and a relay configured to terminate the telephone line with the resistor when the relay is energized by the termination signal. The processor monitors the duration of the termination signal, and ends the termination signal to cause the line to go on-hook if the duration of the termination signal exceeds a predetermined length of time (e.g., 10 seconds).

The apparatus can also include a voltage detector configured for connection to the telephone line. The voltage detector detects the voltage level the telephone line and to provide signals representing the voltage level to the processor. The processor ends the termination signal to cause the line to go on-hook if a signal representing an open switching interval is detected by the voltage detector, or if the voltage detector detects an extension telephone device going off-hook (e.g., where the voltage level drops by more than 5% or 500 mV, whichever is greater). The apparatus can also include a dual tone multi-frequency (DTMF) controlled by the processor, and if an extension telephone device is detected going off-hook, the processor can cause the DTMF generator to provide DTMF signals on the telephone line, e.g., to signal back to the LTS that the test has been interrupted.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
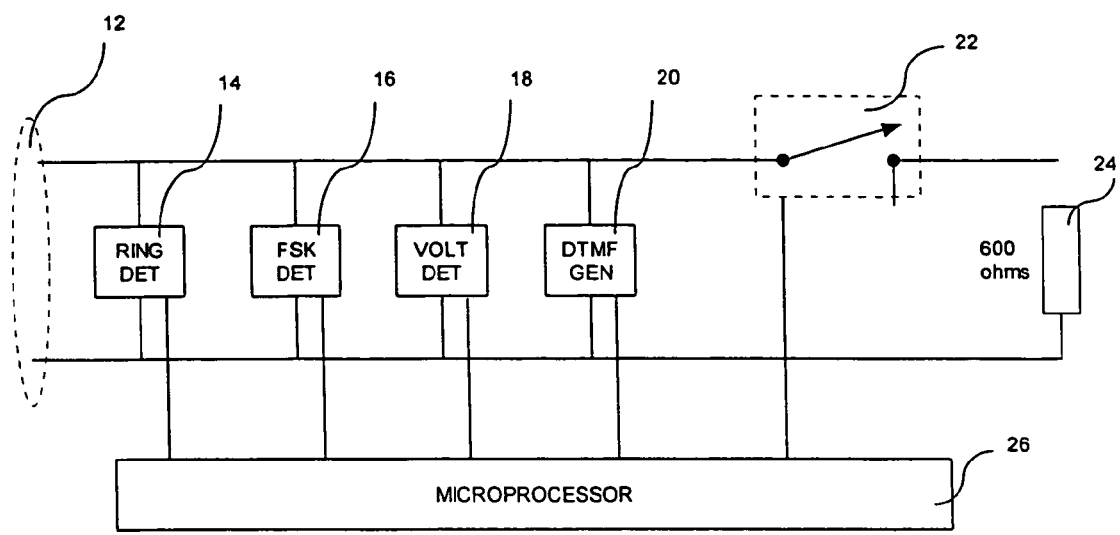
FIG. 1 is a block diagram of a loop test apparatus.

A block diagram of a loop test apparatus 10 in accordance with the invention is shown in FIG. 1. The loop test apparatus 10 is connected to the telephone network at connection point 12, typically an RJ-11 "modular" telephone jack common to most telephones. The loop test apparatus 10 includes several functional circuits, including Ring Voltage detector 14, frequency-shift keyed (FSK) detector 16, Line Voltage detector 18, dual tone multi-frequency (DTMF) transmitter 20, and Hook Switch relay 22, that are all controlled by software running on Microprocessor 26.

Ring Voltage detector 14 detects the presence of ring signals transmitted by the telephone company switching system. Ring Voltage detector 14 is an optoisolator circuit, such as Siemens part 4N26, bridging to the line through a high voltage capacitor and resistor so as to minimize ringer loading. The output of detector 14 indicates the presence of ring signals on the line, and is connected to Microprocessor 26.

FSK detector 16 receives frequency-shift keyed data present on the telephone line, converts the data into a digital format, and sends the digital data to Microprocessor 26 in the form of a serial data stream. FSK detector 16 is a caller ID data receiver chip incorporating filtering and frequency control, such as Mitel part MT8841. FSK detector 16 bridges the telephone line using a pair of high voltage capacitors and resistors (not shown).

Line Voltage detector 18 monitors the telephone line voltage. Line Voltage detector 18 is an analog-to-digital converter, such as from Analog Devices. Line Voltage detector 18 is programmed to detect voltages in the range of 0–21 V with resolution of 500 mV.

DTMF Transmitter 20 is used by Microprocessor 26 to transmit DTMF signals on the telephone line. DTMF Transmitter 20 is a digital-to-analog converter implemented using an operational amplifier, such as National part LM324, driven by outputs from Microprocessor 26 carrying linear pulse code modulated (PCM) data representing the waveform of the DTMF signal.

Hook Switch relay 22 is used to apply termination resistor 24 across the telephone line, causing the apparatus to become off-hook. Relay 22 is controlled by a signal from Microprocessor 26, and is typically a single-pole single-throw form of relay, available from companies such as Omrom.

Termination resistor 24, when connected across the telephone line by relay 22, is sufficient to draw current through the telephone loop, causing the telephone company switching system to detect an off-hook condition. Termination resistor 24 is 600 ohms.

The loop test apparatus 10 is located at the customer premises and can be used for remotely diagnosing telephone line impairments, especially concerning the local loop and customer premises wiring, e.g., for determining if the line is suitable for new services, such as DSL. In general terms, the loop test apparatus 10 incorporates an integrated local loopback feature that can be controlled from a remote LTS. The loop test apparatus 10 reflects signals transmitted by the LTS back to the LTS so that line characteristics present in the local loop and customer premises wiring can be analyzed.

In operation to evaluate the characteristics of the telephone line, the LTS accesses the loop test apparatus 10 through a stored program controlled switch (SPCS) located in the telephone company Central Office (CO). After the SPCS establishes a voice path to the customer premises in question, the LTS transmits an on-hook GR-30-encoded message to the loop test apparatus 10. In some cases, it may be necessary for the SPCS to transmit an abbreviated ring, ping ring, or open switching interval (OSI) in order to establish the voice path. GR-30 (Bellcore GR-30-CORE, Voiceband Data Transmission Requirements "GR-30") is an open standard that historically has been used for sending Caller ID (ICLID) information to telephone customers, an enhanced subscriber service offered by local telephone companies for a nominal monthly charge. No special provisions are necessary at the telephone company central office switching system other than for Bellcore-standard GR-30 message types, which is now provided by generic software packages from all major switching system manufacturers.

The GR30-encoded message is a Loop Test Message defined specifically for purposes of remotely activating the loop test apparatus 10 at the customer premises, and contains message content that directs the apparatus 10 to go off-hook, as well as optional content relating to the time of day the test is performed and duration of the test.

Figure 2:
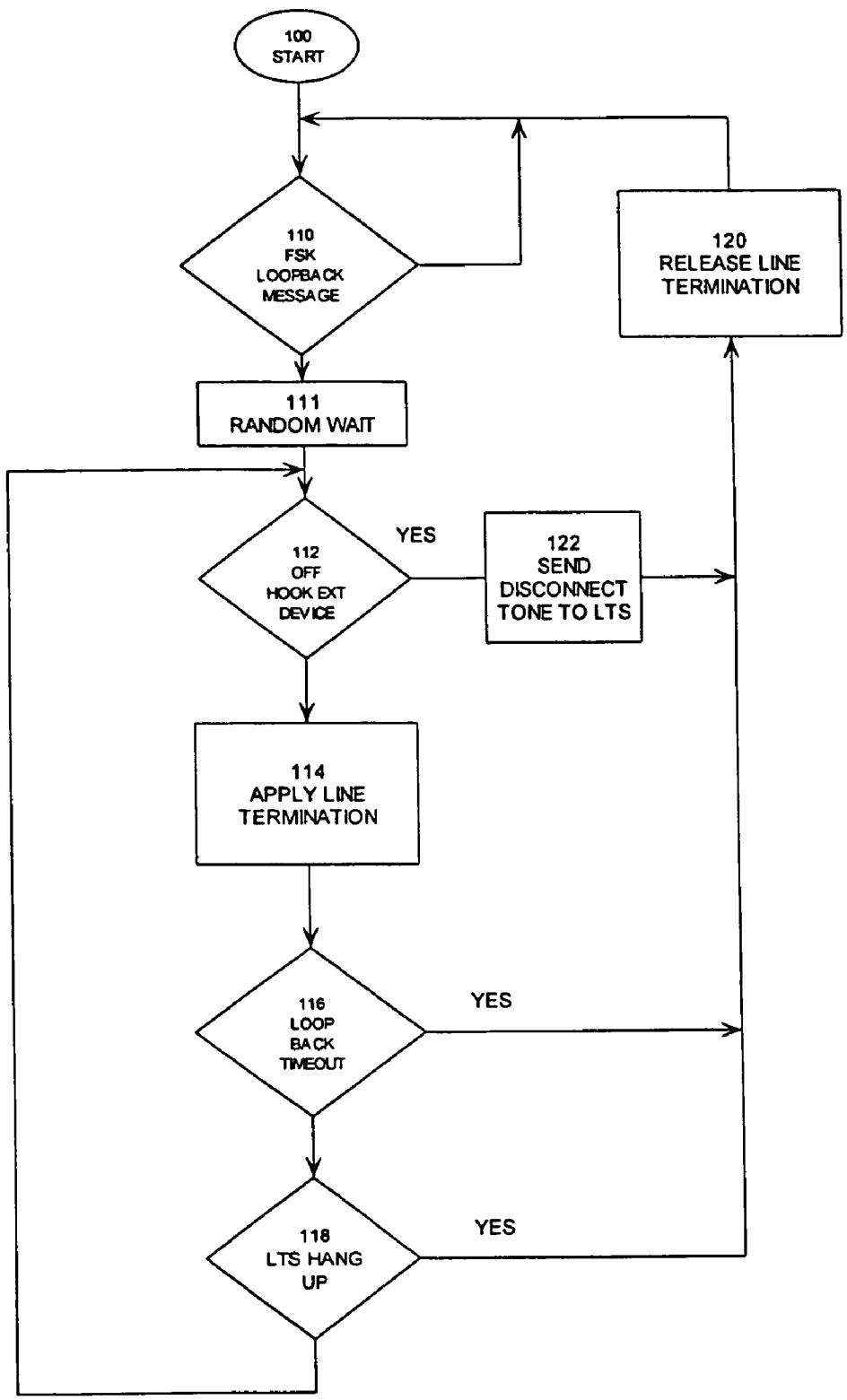
FIG. 2 is a flow chart of the processing states of the loop test apparatus shown in FIG. 1.
Figure 3:
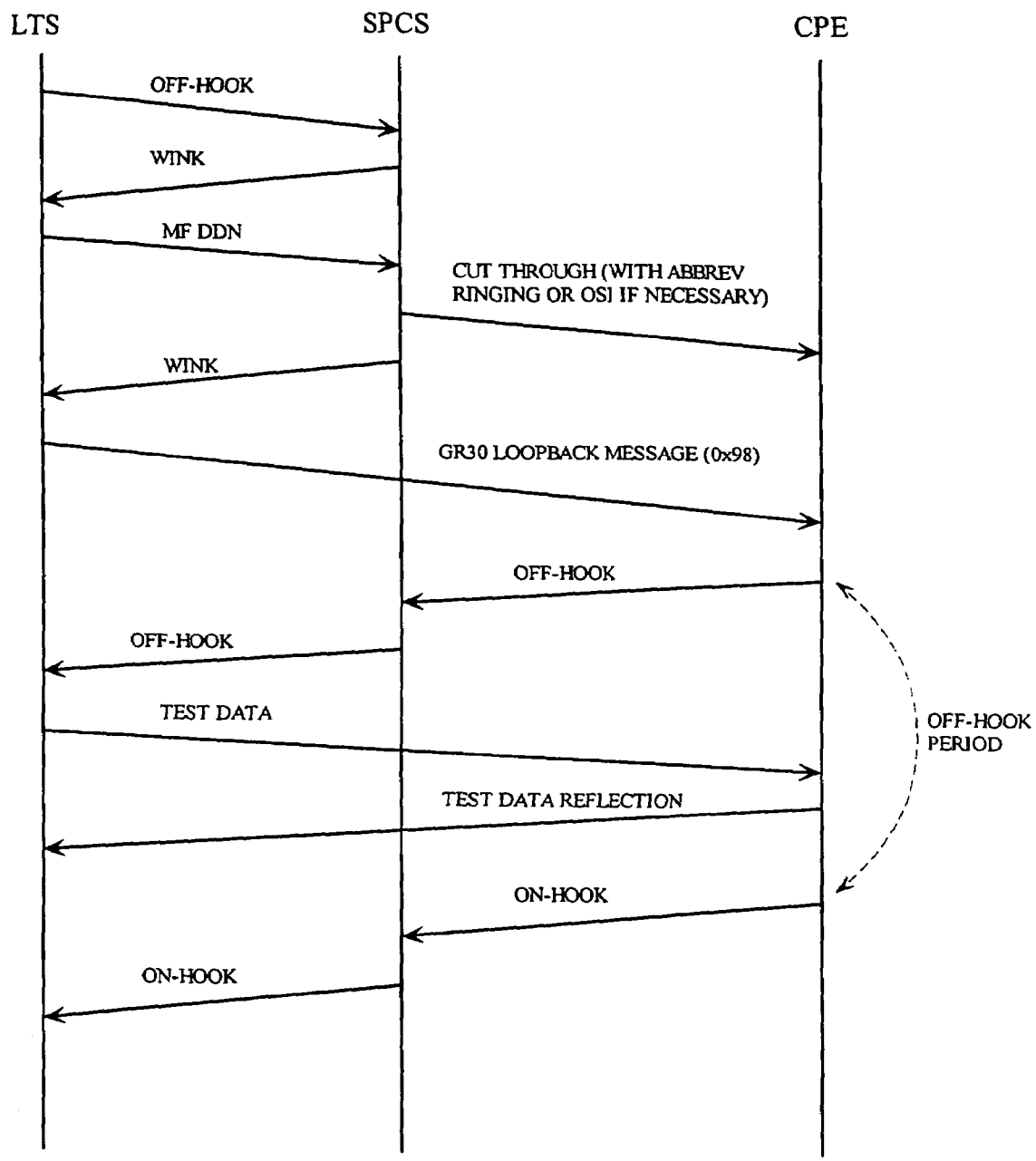
FIG. 3 is a diagram illustrating the interaction between the loop test apparatus, a loop test server, and a telephone line.

FIG. 2 is a flowchart illustrating the processes used to implement the loop test feature. Processing begins at step 100 when the device is enabled. Step 110 checks FSK detector 16 for incoming messages. If a Loop Test Message is received at step 110, processing continues to step 111, where processing waits for a "random" amount of time in the range of 0–1000 ms. The "random" time is derived from a counter running on Microprocessor 26, beginning with the application of power, and develops a random value over time as a result of variation in microprocessor timing crystals and through "random" events such as user access and ring signal detection. (Variations in components used for clocking the internal micro-controllers should, after a very short period of time, allow for good random value generation. In addition, "randomness" can be improved by allowing "random" events such as key presses and ring signals to effect the state of the random variable.)

Following the random wait in step 111, step 112 checks the state of Voltage Detector 18 to see if an extension telephone device is off-hook. If the line voltage is less than 21 VDC, the line is considered to be in-use by another extension (i.e., off-hook). If an extension device is offhook, then processing continues to step 122 to transmit a disconnect signal to the LTS using DTMF generator 20, then on to step 120, thereby releasing any termination applied to the line by Hook Switch relay 22. If no extension devices are found to be off-hook (i.e., if the line voltage is at least 21 VDC, then processing continues to step 114.

Step 114 engages Hook Switch relay 22, applying line termination resistor 24 across the telephone line, and therefore causing the device to go off-hook and the telephone line to become "in-use." This action is used to "complete" the call, through the telephone network switching equipment, back to the LTS.

Step 116 measures how long Hook Switch relay 22 is engaged. If relay 22 is engaged for more than 10 seconds, processing continues to step 120, whereby relay 22 is released, returning the device on-hook. If relay 22 has been engaged for less than 10 seconds, processing continues at step 118.

Step 118 monitors Voltage Detector 18 for a sudden drop in voltage, known as an open switching interval (OSI), indicating the LTS has stopped the test and released the line. While off-hook, if the apparatus detects a 500 ms OSI, processing continues to step 120, whereby relay 22 is released, returning the device on-hook within 100 ms. If an OSI is not detected, processing returns to step 112.

While the loop test is in process, the loop test apparatus 10 monitors for any extension telephone sets (or other extension devices) going off-hook. The apparatus 10 detects when an extension set goes off-hook when the "in use" DC voltage drops by more than 5% or 500 mV, whichever is greater. If an extension set goes off-hook during the test, the apparatus 10 transmits a DTMF-D signal for 70 ms, and go on-hook within 100 ms of detecting the voltage drop.

The apparatus has a user-selectable option to disable the loop test feature on the specific device. The apparatus is configured with the loop test feature enabled (as a default).

Other embodiments are within the scope of the following claims.

What is claimed is:

1. Telephone line diagnostic equipment for use with a loop test server, the equipment comprising:
    a frequency shift key (FSK) data detector configured for connection to a telephone line, wherein the data detector is configured to detect data encoded in accordance with the GR-30 standard provided on the telephone line and to provide signals representing the detected data at an output;
    a telephone line terminator configured for connection to the telephone line, wherein the telephone line terminator terminates the telephone line in response to a termination signal received at an input, thereby causing an off-hook condition, and wherein the telephone line terminator is configured to reflect test signals sent by the loop test server over the telephone line back over the telephone line during the off-hook condition;
    and a processor connected to the output of the data detector and the input of the telephone line terminator, wherein the processor monitors the signals provided at the output of the data detector for a Loop Test Message from the loop test server and provides a termination signal to the input of the telephone line terminator in response to the receipt of the Loop Test Message, wherein the Loop Test Message includes data other than caller-identification data of the loop test server.

2. The equipment of claim 1 wherein the telephone line terminator comprises a resistor and a relay configured to terminate the telephone line with the resistor when the relay is energized by the termination signal.

3. The equipment of claim 1 wherein the processor is a microprocessor.

4. The equipment of claim 1 wherein the processor monitors duration of the termination signal to the input of the telephone line terminator.

5. The equipment of claim 4 wherein the processor ends the termination signal if the duration of the termination signal exceeds a predetermined length of time.

6. The equipment of claim 1 wherein the processor monitors the signals provided at the output of the data detector for a Stop Test Message and ends the termination signal to the input of the telephone line terminator in response to the receipt of the Stop Test Message.

7. The equipment of claim 1 further comprising a voltage detector configured for connection to the telephone line, wherein the voltage detector is configured to detect the voltage level the telephone line and to provide signals representing the voltage level at an output, and wherein the processor monitors the signals provided at the output of the voltage detector.

8. The equipment of claim 7 wherein the processor ends the termination signal to the input of the telephone line terminator in response to a signal representing an open switching interval provided at the output of the voltage detector.

9. The equipment of claim 7 wherein the processor ends the termination signal to the input of the telephone line terminator in response to a signal representing an extension telephone device going off-hook provided at the output of the voltage detector.

10. The equipment of claim 7 wherein the processor ends the termination signal to the input of the telephone line terminator when the output of the voltage detector indicates that the voltage level has dropped by more than 5% or 500 mV, whichever is greater.

11. The equipment of claim 7 further comprising a dual tone multi-frequency (DTMF) generator connected at an input to the processor, and configured for connection to the telephone line, wherein the DTMF generator provides DTMF signals on the telephone line in response to signals received at the input from the processor.

12. The equipment of claim 11 wherein the processor causes the DTMF generator to send DTMF signals in response to a signal representing an extension telephone device going off-hook provided at the output of the voltage detector.

13. The equipment of claim 11 wherein the processor causes the DTMF generator to send DTMF signals when the output of the voltage detector indicates that the voltage level has dropped by more than 5% or 500 mV, whichever is greater.

14. A telephony apparatus comprising:
    detecting means, connected to a telephone line, for detecting a Loop Test Message signal sent by a remote loop testing server, wherein the Loop Test Message includes data encoded in accordance with the GR-30 standard other than caller-identification data of the remote loop testing server;
    central processing means, connected to said detecting means, for measuring the time the loop test is activated;
    hook switch means, connected to said central processing means, for terminating the telephone line during the loop test in response to the detection of the Loop Test Message by the detecting means, and for reflecting test signals sent over the telephone line by the remote loop testing server back over the telephone line during the loop test;
    voltage detecting means, connected to said central processing means, for measuring the voltage on the telephone line in order to determine if an extension telephone device is off-hook.

15. The telephony apparatus of claim 14 further comprising a telephone set, and wherein the loop test apparatus is included within the telephone set.

16. The telephony apparatus of claim 14 further comprising a Caller ID device, and wherein the loop test apparatus is included within the Caller ID device.

17. The telephony apparatus of claim 14 further comprising a computer modem, and wherein the loop test apparatus is included within the computer modem.

18. The telephony apparatus of claim 14 further comprising a computer-telephony interface board, and wherein the loop test apparatus is included within the computer-telephony interface board.

19. The telephony apparatus of claim 14 further comprising a telephone answering device, and wherein the loop test apparatus is included within the telephone answering device.

20. A method of interfacing with a loop test server comprising:
  detecting a Loop Test Message signal sent by the loop test server, wherein the Loop Test Message includes data encoded in accordance with the GR-30 standard other than caller-identification data of the loop test server;
  detecting if extension telephone devices are off-hook;
  in response to the receipt of a Loop Test Message, terminating the telephone line with an impedance in order to connect the call back to the loop test server and reflecting test signals sent over the telephone line by the loop test server back over the telephone line;
  measuring the duration of the loop test.

21. The method of claim 20 wherein the method is performed by a telephone set.

22. The method of claim 20 wherein the method is performed by a caller ID device.

23. The method of claim 20 wherein the method is performed by a computer modem.

24. The method of claim 20 wherein the method is performed by a computer-telephony interface board.

25. The method of claim 20 wherein the method is performed by a telephone answering device.

26. A system for evaluating a telephone line having a first end and a second end, the system comprising:
  a loop test server comprising:
    a Loop Test Message generator configured for communication with the first end of the telephone line, wherein the Loop Test Message generator generates a Loop Test Message that includes data encoded in accordance with the GR-30 standard other than caller-identification data of the loop test server;
    a test signal generator configured for communication with the first end of the telephone line;
  a diagnostic device comprising:
    a data detector configured for communication with the second end of the telephone line, wherein the data detector is configured to detect data encoded in accordance with the GR-30, and to provide signals representing the detected data at an output;
    a telephone line terminator configured for communication with the second end of the telephone line, wherein the telephone line terminator terminates the second end of the telephone line in response to a termination signal received at an input, thereby causing an off-hook condition, and wherein the telephone line terminator is configured to reflect test signals sent by the test signal generator of the loop test server and received at the second end of the telephone line back over the telephone line during the off-hook condition;
    and a processor configured for communication with the output of the data detector and the input of the telephone line terminator, wherein the processor monitors the signals provided at the output of the data detector for a Loop Test Message from the Loop Test Message generator of the loop test server, and provides a termination signal to the input of the telephone line terminator in response to the receipt of the Loop Test Message.

27. The system of claim 26 wherein the test signal generator generates test signals over a range of frequencies.

28. The system of claim 27 wherein the loop test server further comprises an analyzer configured to perform a return loss measurement at the range of frequencies to determine aspects of the frequency response of the telephone line.

* * * * *